Figure 1:
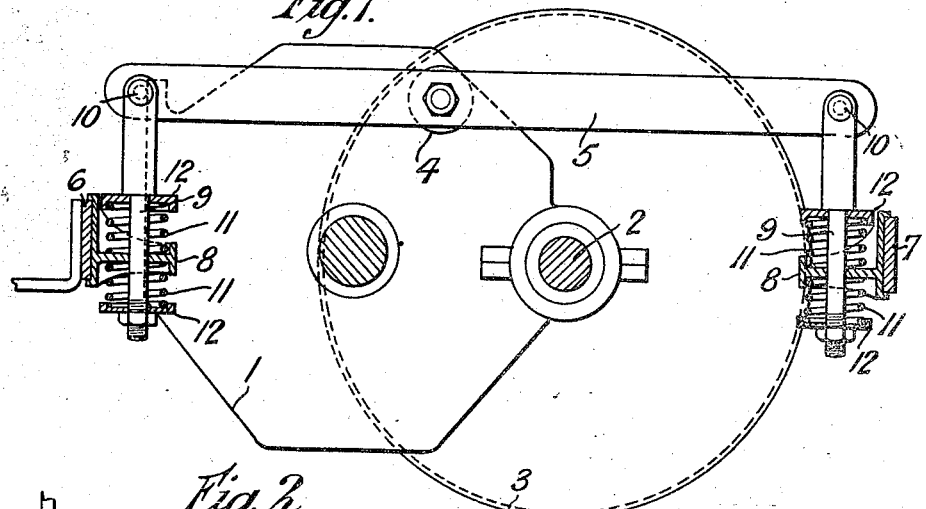

Sept. 28, 1926.

A. H. JACKSON 1,601,072

ELECTRICALLY PROPELLED VEHICLE

Filed June 15, 1925     3 Sheets-Sheet 1

Inventor
A. H. Jackson
By his Attorneys

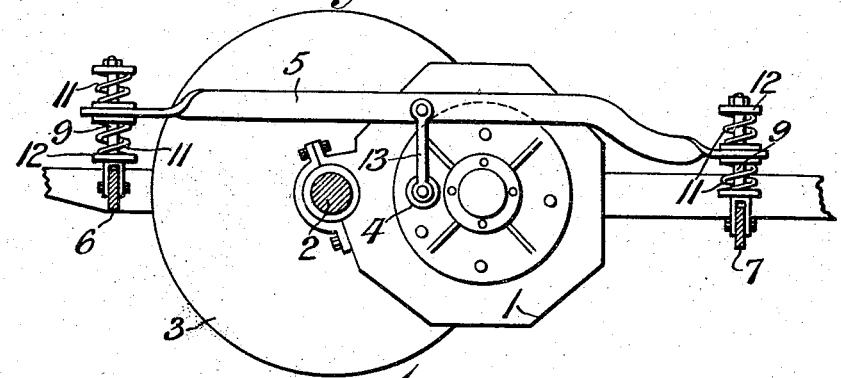
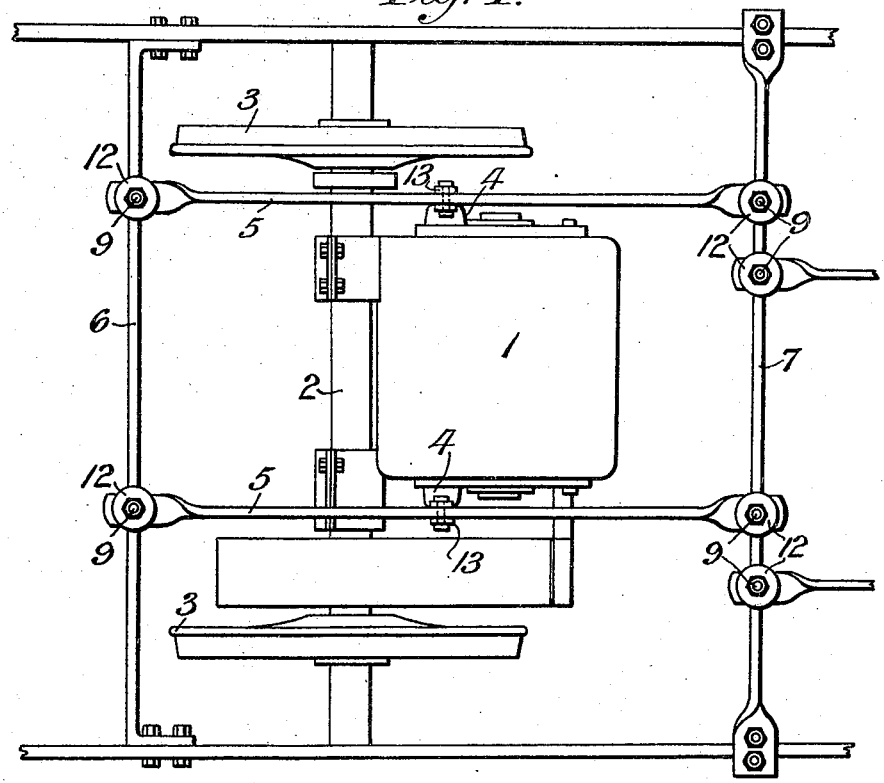

Sept. 28, 1926.
A. H. JACKSON
1,601,072
ELECTRICALLY PROPELLED VEHICLE
Filed June 15, 1925   3 Sheets-Sheet 3
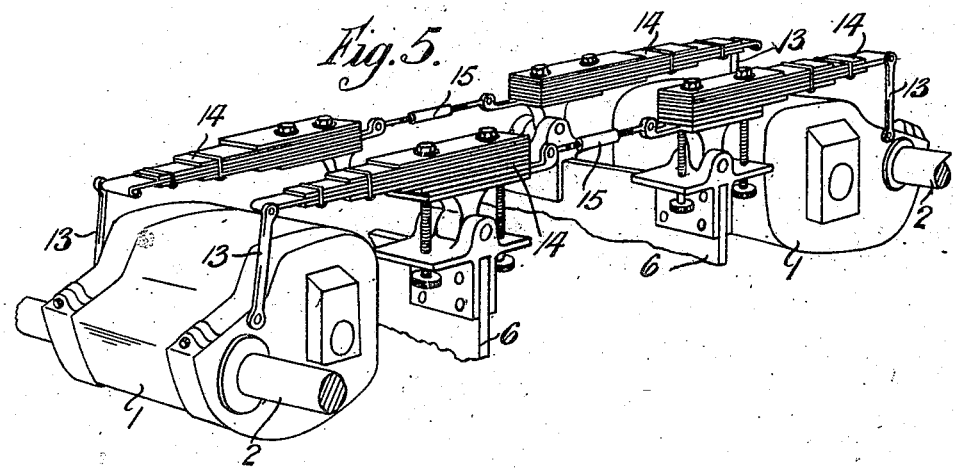
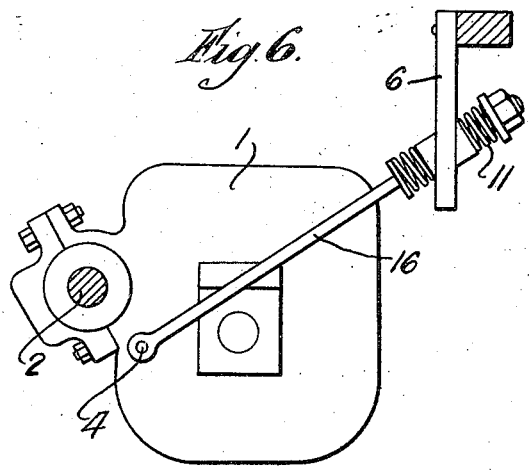
Inventor,
A. H. Jackson,
By his Attorneys, Patented Sept. 28, 1926.

1,601,072

UNITED STATES PATENT OFFICE.

ALBERT HENRY JACKSON, OF LONDON, ENGLAND.

ELECTRICALLY-PROPELLED VEHICLE.

Application filed June 15, 1925, Serial No. 37,189, and in Great Britain July 29, 1924.

This invention relates to electric locomotives, tramcars or other electrically propelled vehicles, of the type in which there is employed a driving unit comprising a driving axle having road wheels mounted thereon, and an electrically driven motor which is supported from the truck frame and mounted at one side on said axle and geared thereto.

In the usual type of driving units, as heretofore constructed there is, to a greater or less degree, the disadvantage that a proportion of the weight of the motor (in some cases a considerable proportion) and that of the axle, wheels and other appurtenances mounted on the axle, is unsupported by springs and excercises an uncushioned hammering effect upon the track, with detrimental results to joints, points and crossings in the track, and also to the motor, truck and vehicle body generally.

The main object of the invention is so to support the driving unit from the truck frame that this defect may be avoided and so that in the passage of the vehicle over the track, shocks arising from the driving unit are transmitted through resilient medium and not as a dead hammering load.

In order to effect this, I support from the truck frame the motor of the driving unit in such a manner that the point or points of suspension of the said unit lie solely between (that is within) parallel vertical planes passing respectively through the axis of the driving axle and the centre of mass of the motor.

Preferably the means for effecting this are such that they are readily applicable to existing units.

In the preferred form of construction the driving unit comprised of the motor and the driving truck axle, with all those parts usually unspring-borne thereon, for example, the road wheels, gear wheels, gear case, driving axle boxes and axle collars, is spring-supported on or suspended from the truck frame, the point of support or suspension lying in a vertical plane passing through the centre of mass of the unit and parallel to the axis of the driving axle.

With this construction, if the truck frame be suspended in mid air, the driving unit is suspended at its point of balance from the said truck frame, as distinct from the arrangements heretofore in use, in which, if the truck frame be suspended in mid air, the driving axle and road wheels fall. It will be readily seen that, in the case of a driving unit suspended according to the present invention, the road wheels rise or fall when meeting inequalities in the track, without constituting of themselves a dead weight, since the dead weight of the said driving axle and driving wheels is balanced by that of the motor.

It is to be understood that the term "spring-supported" is intended to mean an arrangement in which trunnions or the like forming the point of support or suspension are in effect connected to the frame through springs or other resilient medium in compression or tension.

It will be further seen that in such a construction substantially no part of the motor is permitted to form a dead weight upon the axle, virtually the whole thereof being resiliently supported in manner such that detrimental shocks to the motor, truck and track rails are avoided; also that the distance between the axis of the motor and that of the axle is maintained constant, thus ensuring correct relationship between the members of the driving gearing.

The accompanying drawings show diagrammatically how my invention can be carried into effect, those parts only being shown which are necessary to describe the invention. Figure 1 is a sectional elevation, Figure 2 a plan of Figure 1, Figure 3 a sectional elevation of a modification and Figure 4 a plan. Figure 5 is a perspective view and Figure 6 is an end elevation of further modifications.

Figure 2:
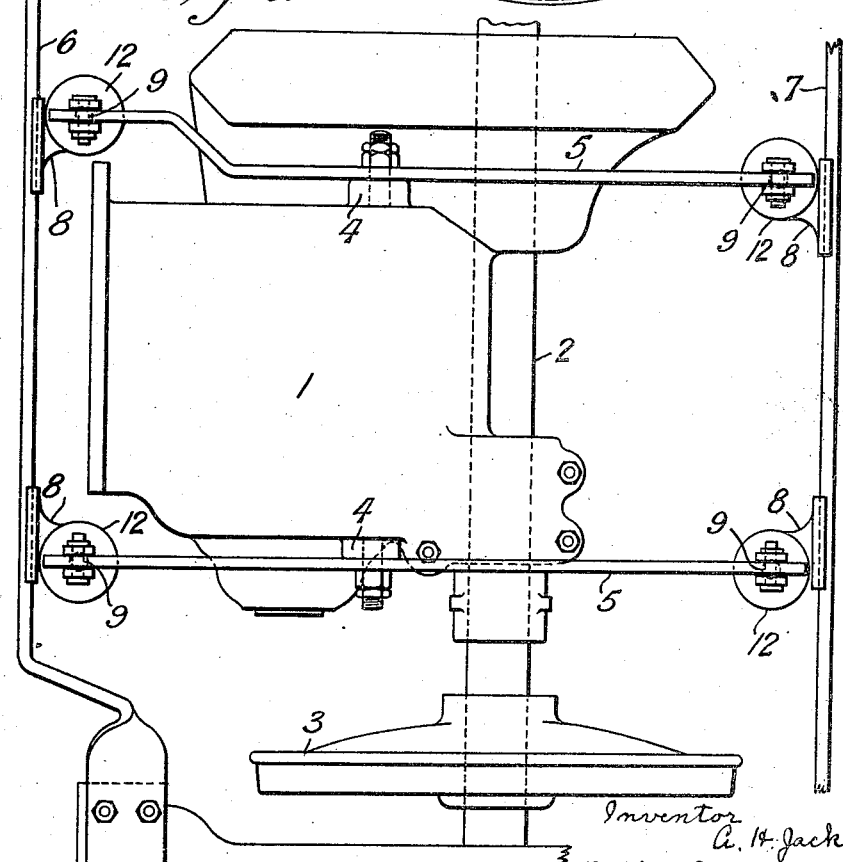

Referring more particularly to Figures 1 and 2, 1 is an electric motor, 2 the truck or driving axle connected in the usual manner to the motor by gearing which has been omitted for clearness. 3 are the truck wheels on the axle 2. 4 are bosses on the motor casing located in a vertical plane passing through the centre of mass of the unit comprised of the motor 1, axle 2 and truck wheels 3. 5 are bars which are pivotally connected to the bosses 4, and 6, 7 are cross members of the truck, each provided with brackets 8 bored to receive pins 9 pivoted to the bars 5 at 10. 11 are springs interposed between the brackets 8 and caps 12 on the pins 9.

In Figures 3 and 4, similar parts have similar numerals; the general arrangement is the same, except that the bars 5 have pivoted to them links 13 which are pivoted to bosses 4 integral with the motor.

The modification shown in Figure 5 is similar to that shown in Figures 3 and 4, except that the links 13 are suspended from springs 14 secured to cross members 6. Each pair of springs 14 is connected together by a link 15 in order to relieve the cross members of twisting strain.

In the modification shown in Figures 6, the weight of the unit is taken by links 16 pivoted to the unit and supported from a cross member 6 on the truck frame through the intervention of springs 11.

What I claim is:—

1. In an electrically driven vehicle, the combination of a truck frame, a unit comprising an axle carried by said frame, an electrically driven motor mounted at one side on said axle and geared thereto and road wheels on said axle, and means for supporting the unit from said frame, the said means having at least one point of connection to said frame, the point or points of connection on the motor lying solely between (that is, inside) parallel vertical planes passing respectively through the axis of the said axle and the centre of mass of the motor.

2. In an electrically driven vehicle, the combination of a truck frame, a unit comprising an axle carried by said frame, an electrically driven motor mounted at one side on said axle and geared thereto and road wheels on said axle, means for supporting the unit from said frame, the said means having at least one point of connection to said frame, and cushioning means interposed between the said means and the frame, the point or points of connection on the motor lying solely between (that is, inside) parallel vertical planes passing respectively through the axis of the said axle and the centre of mass of the motor.

3. In an electrically driven vehicle, the combination of a truck frame, a unit comprising an axle carried by said frame, an electrically driven motor mounted at one side on said axle and geared thereto and road wheels on said axle, and means for supporting the unit from said frame, the said means having at least one point of connection to said frame, the point or points of connection on the unit lying solely in a vertical plane passing through the centre of mass of the unit and parallel to the axis of the said axle.

4. In an electrically driven vehicle, the combination of a truck frame, a unit comprising an axle carried by said frame, an electrically driven motor mounted at one side on said axle and geared thereto and road wheels on said axle, means for supporting the unit from said frame, the said means having at least one point of connection to said frame, and cushioning means interposed between the said means and the frame, the point or points of connection on the unit lying solely in a vertical plane passing through the centre of mass of the unit and parallel to the axis of the said axle.

5. In an electrically driven vehicle, the combination of a truck frame, a unit comprising an axle carried by said frame, an electrically driven motor mounted at one side on said axle and geared thereto and road wheels on said axle, a bar, springs connecting each end of said bar to said frame, and means for supporting the unit from said bar, the point or points of connection on the motor lying solely between (that is, inside) parallel vertical planes passing respectively through the axis of the said axle and the centre of mass of the motor.

6. In an electrically driven vehicle, the combination of a truck frame, a unit comprising an axle carried by said frame, an electrically driven motor mounted at one side on said axle and geared thereto and road wheels on said axle, a bar, springs connecting each end of said bar to said frame, and means for supporting the unit from said bar, the point or points of connection on the unit lying solely in a vertical plane passing through the centre of mass of the unit and parallel to the axis of the said axle.

7. In an electrically driven vehicle, the combination of a truck frame, a unit comprising an axle carried by said frame, an electrically driven motor mounted at one side on said axle and geared thereto and road wheels on said axle, a pair of bars, springs connecting each end of each bar to said frame, bosses on said motor, and supporting links connecting said bosses to said bars, the said bosses lying solely between parallel vertical planes passing respectively through the axis of the said axle and the centre of mass of the motor.

8. In an electrically driven vehicle, the combination of a truck frame, a unit comprising an axle carried by said frame, an electrically driven motor mounted at one side on said axle and geared thereto and road wheels on said axle, a pair of bars, springs connecting each end of each bar to said frame, bosses on one of the members of said unit, and supporting links connecting said bosses to said bars, said bosses lying solely in a vertical plane passing through the centre of mass of the unit and parallel to the axis of the said axle.

9. An electrically driven motor having supporting means such as bosses, whereby in an electrically driven vehicle having a truck frame, a unit comprising an axle carried by said frame, an electrically driven motor mounted at one side on said axle and geared thereto and road wheels on said axle, the motor can be supported from said frame by said supporting means, the said supporting means on the said motor lying solely between (that is, inside) parallel vertical planes passing respectively through the axis of the said axle and the centre of mass of the motor.

10. An electrically driven motor having supporting means such as bosses, whereby in an electrically driven vehicle having a truck frame, a unit comprising an axle carried by said frame, an electrically driven motor mounted at one side on said axle and geared thereto and road wheels on said axle, the motor can be supported from said frame by said supporting means, the said supporting means on the said motor lying solely in a vertical plane passing through the centre of mass of the unit and parallel to the axis of the said axle.

In testimony that I claim the foregoing as my invention I have signed my name this 3rd day of June, 1925.

ALBERT HENRY JACKSON.